United States Patent [19]

Donato et al.

[11] 4,364,444

[45] Dec. 21, 1982

[54] TEMPERATURE REGULATION SYSTEM FOR ELECTRIC VEHICLES

[75] Inventors: Guido A. Donato, Wayne; Edwin E. Hammond, Norristown; Robert A. Mullowney, Willow Grove, all of Pa.

[73] Assignee: Drexel Industries, Inc., Horsham, Pa.

[21] Appl. No.: 225,715

[22] Filed: Jan. 16, 1981

[51] Int. Cl.³ .............................................. B60H 1/16
[52] U.S. Cl. .................................. 180/65 R; 98/2.01; 165/104.34; 180/54 A; 237/12.3 A; 361/384
[58] Field of Search ......................... 180/54 A, 65 R; 98/2.16, 2.05, 2.01, 2.06, 2.07, 1; 165/41, 43, 104.34; 361/384; 318/58, 63, 62, 139; 237/12.3 A; 414/633, 634; 236/49, 74 R, 74 A

[56] References Cited

U.S. PATENT DOCUMENTS

| | | | |
|---|---|---|---|
| 2,319,035 | 5/1943 | Breese | 98/2.16 |
| 2,789,007 | 5/1957 | Howell | 296/28 |
| 3,451,469 | 6/1969 | Hall et al. | 180/54 A |
| 3,732,801 | 5/1973 | Wallis | 98/2.16 |
| 4,026,349 | 5/1977 | Schaap | 165/104.34 |
| 4,087,776 | 5/1978 | Donato | 74/512 |
| 4,093,021 | 6/1978 | Groom | 361/384 |
| 4,291,749 | 9/1981 | Ootsuka | 236/49 |
| 4,331,209 | 5/1982 | Bauer | 180/54 A |

Primary Examiner—David M. Mitchell
Attorney, Agent, or Firm—Paul & Paul

[57] ABSTRACT

A temperature regulation system for use in an electric vehicle automatically provides for open-loop and closed-loop operation. In the closed-loop mode, air is forced through the electric motors of the vehicle, and is then delivered to selected components of the vehicle to keep them warm and dry. In the open-loop mode, outside air is allowed to enter the system to prevent overheating of critical components. The system is intended for use in an electric vehicle, such as a fork lift truck, which must alternate between operation in extremely cold environments and operation at normal temperatures.

17 Claims, 2 Drawing Figures

TEMPERATURE REGULATION SYSTEM FOR ELECTRIC VEHICLES

BACKGROUND OF THE INVENTION

This invention relates to electric vehicles such as fork lift trucks and tow tractors and discloses a temperature regulation system for use on such a vehicle which is intended to be operated in extremely cold environments as well as extremely warm environments.

Fork lift trucks have been known for some time. Examples of fork lift trucks are shown in U.S. Pat. Nos. 3,637,100 and 3,532,238. Both of the latter two patents are incorporated by reference herein. While fork lift trucks of the type described in the above-cited patents are very useful for most applications, special problems arise when such trucks are to be used in an extremely cold environment, such as a freezer building used to store frozen food. Fork lift trucks are used to transfer frozen food between a freezer warehouse and a large freezer road truck. A vehicle operating in such a freezer warehouse must be able to operate satisfactorily at temperatures as low as about −30° F., while at the same time being able to adapt quickly to operation in outside temperatures, which may be 90° F. or higher on hot summer days.

When a fork lift truck operates in a cold environment, water tends to condense on the truck (the truck being warmer than its surroundings) and this condensation causes eventual corrosion or freeze up of the electrical equipment on the truck. Especially vulnerable are components such as the Silicon Controlled Rectifier (SCR) used in the electrical control system for fork lift vehicles of the type shown in the above-cited patents.

Fork lift trucks are sometimes designed such that all, or almost all, of the electrical components are physically located together, in a so-called electrical box. In such a case, it is important that the electrical box be kept dry, to prevent corrosion. But is is also important that the temperature of the electrical box not become too high, as would tend to happen when the truck is driven out of the freezer warehouse and into a warm environment.

It is also necessary to heat other components of the fork lift truck. For example, the accelerator for the vehicle may comprise a set of components mounted in a box, as shown in U.S. Pat. No. 4,087,776. This accelerator box needs to be kept dry. Also, the control console of the vehicle typically contains a set of components, located in one place, and also needs protection from condensation.

In the past, one solution to the problem of operating an electric vehicle in an extremely cold environment has been to place electric resistance heaters at selected locations around the vehicle. The components of, say, the electrical box could be kept warm and dry in this manner, at the expense of electrical energy needed to supply the heat. In addition to requiring large amounts of energy, resistance heaters will tend to produce too much heat when the vehicle is driven into a warm environment, since the resistance heat is added to the heat in the ambient air.

Electric fork lift vehicles are typically driven by DC motors, which have efficiencies of about 85%, under no load conditions, and about 70% in a loaded condition. The remaining energy is dissipated as heat. This fact is particularly ironic in the context of the vehicles for operation in cold environments, since heat is precisely what is needed at certain key positions around the truck, to keep components warm and dry.

The present invention solves the problem of keeping critical components warm and dry while the vehicle is in a cold environment, and does so in a manner which conserves energy Furthermore, the invention allows the vehicle to adjust to the vast difference in ambient conditions between the inside of a freezer and normal outside temperatures.

SUMMARY OF THE INVENTION

The present invention solves the problems described above through the use of a system of ducts which directs air from the heat-producing motors in the electric vehicle to various key components around the vehicle. In the preferred embodiment, heat from the electric traction motor and from the hydraulic pump motor is used to heat air in the ducts, which is directed through the electrical box of the vehicle, as well as through the control console and the accelerator box. Air is then returned to the traction and/or hydraulic pump motors for recycling. When the truck operates in an extremely cold environment, the system of ducts is a closed system. That is, substantially no air from the outside is allowed to enter the system, and air inside the system does not escape to the outside.

When the temperature in a given part of the vehicle, such as the electrical box (the temperature of which should not be allowed to become too high) attains a predetermined value, several valves are actuated which simultaneously open the system of ducts to the outside air, and block the flow of air through the ducts from the electrical box to both the control console and the accelerator. In this manner, outside air is made to pass through the electrical box, keeping said box from exceeding a safe temperature.

The system therefore is converted from a closed-loop to an open-loop system automatically, depending upon the sensed temperature within the electrical box.

Accordingly, it is a primary object of the present invention to provide a temperature regulation system which enables an electrical vehicle to operate in an environment of extremely cold temperature, and to be able to alternate between operation in cold and normal environments.

It is a further object of the present invention to provide a temperature regulation system for an electric vehicle in a manner which conserves energy, by harnessing heat which would otherwise have been wasted.

It is a further object of the present invention to provide a temperature regulation system as described above, wherein the system can be automatically changed from a closed loop to an open loop system, depending upon the temperature measured in a particular location on the vehicle.

It is a further object of the present invention to provide a temperature regulation system as described above, wherein the system tends to prevent condensation of moisture in critical portions of the vehicle, thereby minimizing corrosion of important components.

Other objects and advantages of the present invention will be apparent to those skilled in the art from a reading of the following brief description of the drawings, the detailed description of the invention, and the appended claims.

DETAILED DESCRIPTION OF THE INVENTION

The present invention is designed particularly for use with an electric fork lift vehicle, wherein all or most of the electrical components of the vehicle are mounted in a so-called electrical box, in one compact location on the vehicle. Also, most of the controls for the vehicle are mounted within a control console. In addition, the accelerator for the vehicle may take the form of an accelerator box. Other groupings of vehicle components may exist in such a vehicle, and the choice of groupings illustrated in the preferred embodiment is intended to be illustrative and not limiting.

Figure 1:
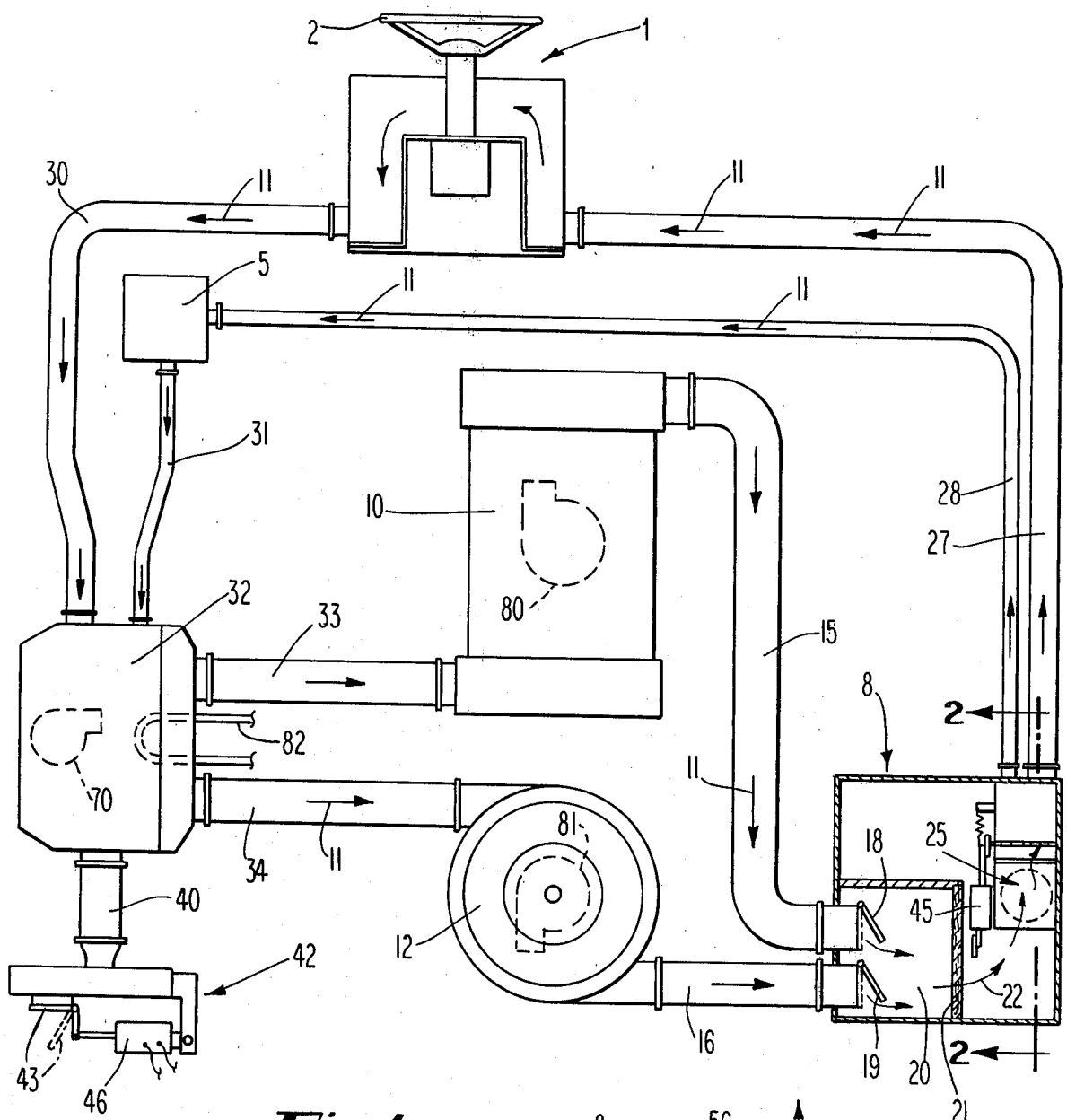
FIG. 1 is an illustration, partly in schematic form, of the temperature regulation system of the present invention, including a cross-sectional view of the electric box.

In FIG. 1, the control console is designated generally by reference numeral 1, the steering wheel being indicated symbolically by reference numeral 2. The accelerator box is designated by reference numeral 5, and the electrical box is designated generally by reference numeral 8. The components within each box are not shown, since a detailed knowledge of the contents of each box is not necessary for understanding of the invention.

Locomotion for the electric vehicle is provided by DC motor 10. Hydraulic lifting capabilities are provided by pump motor 12. Motors 10 and 12 contain fans 80 and 81 positioned within the motors to force air in the directions indicated by arrows 11.

A pair of ducts 15 and 16 are connected between motors 10 and 12 respectively, and electric box 8. These ducts terminate in flapper valves 18 and 19, located within chamber 20, which is itself contained within electrical box 8. The flapper valves close off ducts 15 and 16 except when air is flowing into the electrical box 8. Air exiting from ducts 15 and 16 passes through filter 21, as indicated by arrow 22. The purpose of the filter is to remove, from the air, carbon particles produced at the brushes (not shown) of the DC motors.

The temperature regulation system is shown in FIG. 1 in its closed-loop state, that is, in the condition suitable for operation within an extremely cold environment. Under these conditions, air passing through ducts 15 and 16, and through the electrical box 8, is allowed to pass through valve 25 and into ducts 27 and 28. Duct 27 carries air to control console 1, while duct 28 carries air to accelerator box 5. After having passed through the control console and the accelerator box, air flows through ducts 30 and 31, and then into chamber 32.

Chamber 32 contains a small blower 70 which is positioned to direct the air through ducts 33 and 34, thereby returning the air to motors 10 and 12, to be reheated and recycled. The blower 70 also serves to decrease the back pressure in the ducts. Only one blower in chamber 32 is shown, though more than one blower could be used.

Attached to chamber 32 is duct 40 which is connected to a valve assembly, designated generally by reference numeral 42. This valve assembly comprises a valve plate 43, which is shown in its closed position, that is, preventing outside air from entering the system, and preventing inside air from leaving the system. Both the valve 25 and valve 43 are operated by solenoids, indicated by reference numerals 45 and 46 respectively.

Figure 2:
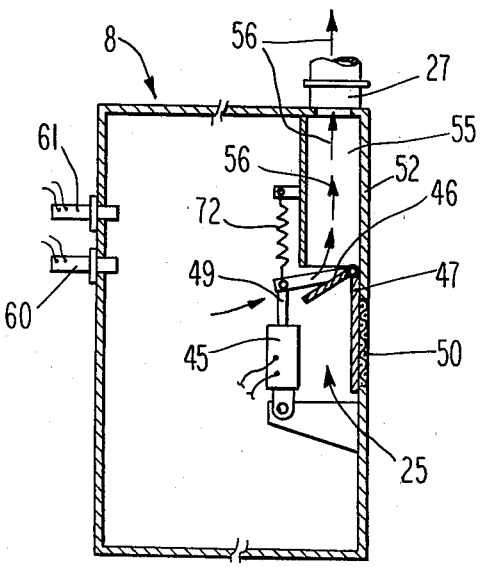
FIG. 2 is a cross-sectional view, taken along the line 2—2 of FIG. 1.

The structure of valve 25 is illustrated in more detail in FIG. 2, which shows another cross sectional view. Valve 25 comprises two portions, plate 46 and plate 47. Plates 46 and 47 are connected to pivot around pivot point 48, in a rigid manner, controlled by piston 49, which is itself moved by solenoid 45. In the position shown in FIG. 2, plate 47 is seen to cover an opening 50 in the wall 52 of electrical box 8. When opening 50 is covered by plate 47, plate 46 allows air to pass into chamber 55, and then into duct 27, as indicated by arrows 56. When the position of the valve is changed, plate 48 closes chamber 55 to the flow of air, while opening electrical box 8 to the flow of air to the outside through opening 50.

Temperature sensing is accomplished by the use of thermostats 60 and 61, positioned to measure the temperature within electrical box 8. In fact, thermostats could be located anywhere around the electrical vehicle. However, since the electrical box contains the components which are in greatest need of protection from extremes of temperature, the preferred embodiment shows the thermostats within the electrical box. In the preferred embodiment, thermostats 60 and 61 are connected in parallel, so that one may fail without causing the system to break down. The electrical connection between thermostats 60 and 61, and solenoids 45 and 46, is not shown in the drawing, but is accomplished in any conventional manner.

The operation of the temperature regulation system will now be described. When the electric vehicle is located within an extremely cold environment, the position of the valves is as shown in the drawings. That is, valve plate 43 is positioned to close off chamber 32 from outside air. Also, valve 25 is disposed as shown in the drawings, permitting air to flow from the electrical box into ducts 27 and 28, but not to the outside through opening 50. Thus, the system functions as a closed-loop system, with air being driven by fans 80 and 81 in the respective motors 10 and 12, around the system, in the direction of arrows 11.

When the temperature in the electrical box 8 reaches a predetermined value, generally 120° F., thermostats 60 and 61 emit a signal, which causes solenoids 45 and 46 to change the positions of valves 25 and 42. The position of valve 25 becomes such, that plate 46 closes chamber 55 to the passage of air, and opens electrical box 8 to outside air, via opening 50. Valve 42 simultaneously changes its position such that flapper valve 43 is in the position shown in phantom, thereby allowing outside air to enter chamber 32, through duct 40. In this situation, the system functions in its open-loop form.

It is seen, in FIG. 2, that the piston 49 is held in place by a spring 72. Thus, in the embodiment shown, the solenoid 45 would be energized in the closed-loop mode and de-energized in the open-loop mode. However, the invention clearly includes an embodiment wherein the solenoid is de-energized in the closed-loop mode and vice versa. The important thing is that the valves change position upon signal from the thermostat. The state of energization of the solenoid is not important, as long as the desired valves are opened and closed at the desired times.

In the open-loop operation, air from the outside enters chamber 32, and is directed through motors 10 and 12, and into electrical box 8, whereupon the air exits through opening 50 in the electrical box. During this time, air does not circulate through the other ducts in the system, i.e. the ducts connected to control console 1 and accelerator box 5, because ducts 27 and 28 have been closed off by valve 25.

When operating in the open-loop system, outside air is therefore made to cool motors 10 and 12 as well as electrical box 8. Even if the electric vehicle is operating in an extremely warm environment the temperature differential between ambient air and the components will provide component cooling. Air from the outside does not cool the control console 1 and accelerator box 5. The components in the console 1 and accelerator 5 are of the type which can withstand higher operating temperatures than would be tolerated by the components of the electrical box 8. Of course, were there heat-sensitive elements in the control console and/or accelerator box (or elsewhere), the duct and valve system could be modified to maintain air flow to the components in need of cooling, within the teachings of this invention.

In order to increase the efficiency of cooling of the electrical box, it is possible to place an additional fan (not shown) within the electrical box to facilitate the flow of air into the electrical box 8 and out of said box through opening 50.

It is seen that heat generated from the traction and pump motors 10 and 12 is made to serve a useful purpose, i.e., the heating of the critical components of the vehicle, thereby preventing condensation in extremely cold environments. Furthermore, the oil line 82, which serves the power steering system of the vehicle, can be routed through chamber 32, and can therefore be heated by the hot air which passes through the chamber on its return trip to the motors 10 and 12. There is thus no need for an immersion heater in the oil tank.

It is understood that the above described embodiment is only one of many variations possible within the spirit of the present invention. As stated earlier, the precise location of specific components around the vehicle can be varied in many ways, and additional ducts can be constructed to direct warm air to such locations. The location and number of thermostats can be varied as well. The location of fans, to assist in directing air along the desired path, can be varied in known configurations. It is therefore understood that the present invention is not to be deemed limited by the precise embodiment described herein. Other embodiments are intended to be covered within the scope and spirit of the following claims.

What is claimed is:

1. A temperature regulation system, for use in an electric vehicle, operable in both cold and warm environments, the vehicle having at least one electric motor and at least one control component, comprising
   first duct means for directing air from the motor to the control component,
   second duct means for returning air from the control component to the motor,
   means for forcing air through the first and second duct means,
   temperature sensing means disposed within the control component, and
   valve means, operatively connected to and actuated in response to signals from, the temperature sensing means, the valve means comprising means for exposing the control component to outside air.

2. The system of claim 1, wherein the valve means further comprises means for blocking the flow of air in at least one of the duct means.

3. The system of claim 2, wherein the temperature sensing means and valve means are connected such that the system is substantially closed to outside air when the temperature in the control component is below a predetermined value, and such that the system is open to outside air when the temperature in the control component attains or exceeds a predetermined value.

4. The system of claim 2, wherein the valve means comprises means for opening the system to outside air in at least two distinct locations within the system.

5. The system of claim 4, wherein the temperature sensing means comprises a thermostat.

6. The system of claim 5, wherein the valve means are solenoid-operated.

7. In an electric vehicle suitable for operation inside food-storage freezers, the vehicle having an electric traction motor, a hydraulic-pump motor, an electrical box containing a substantial proportion of the electrical components of the vehicle, an accelerator and a control console, the improvement which comprises:
   a closed system of ducts arranged so as to direct air from the traction motor and pump motor to the electrical box, to the console, and to the accelerator, and back to the traction and pump motors,
   means for forcing air through the system, and
   means for opening the system to outside air when the temperature in the electrical box reaches a predetermined value.

8. The improvement of claim 7, further comprising means for blocking the flow of air from the electrical box to the console and to the accelerator, the blocking means being capable of being actuated simultaneously with the opening means.

9. The improvement of claim 8, further comprising second means for opening the system to outside air, operatively associated with the blocking means, for opening the electrical box to the outside air when the temperature in the electrical box reaches a predetermined value.

10. The improvement of claim 9, wherein the second means for opening is mechanically attached to the blocking means.

11. The improvement of claim 10, wherein the electrical box comprises two openings, one opening communicating with the control console and accelerator and one opening communicating with the outside, and wherein the second means for opening and the blocking means comprise a pair of pivotable members disposed adjacent the openings in the electrical box, the pivotable members being positioned to close off either of the openings in the electrical box.

12. The improvement of claim 11, further comprising a chamber having a blower, the chamber being connected so as to direct air from the accelerator and control console towards the traction and pump motors.

13. The improvement of claim 12, wherein both means for opening the system comprise a solenoid-operated valve.

14. A temperature regulation system for use in an electric fork lift vehicle, the vehicle being designed for operation within extremely cold environments, the vehicle being designed such that most of its electrical components are disposed within an electrical box, and also including a control console and an accelerator box, and having at least one electric motor, the system comprising:

means for directing air from the motor into the electrical box, means for directing air from the electrical box to both the control console and the accelerator, means for directing air from the control console and accelerator back to the electric motor, and temperature-responsive means for opening the system to outside air when the temperature within the electrical box exceeds a predetermined value.

15. In an electric fork lift vehicle having a traction motor, a hydraulic pump motor, an electrical box, a control console, an accelerator, and a blower chamber, a temperature regulation system comprising:

a set of ducts, leading from the traction and pump motors to the electrical box, and leading from the electrical box to both the control console and the accelerator, and leading from the control console and the accelerator to the blower chamber, and from the blower chamber back to the traction and pump motors, and temperature-responsive means for simultaneously opening the ducts to outside air and closing the ducts leading from the electrical box to the control console and the accelerator.

16. The system of claim 15, wherein an oil conduit is arranged to pass through the chamber whereby oil in the conduit is heated upon passage through the chamber.

17. The system of claim 16, the temperature-responsive means comprising a thermostat operatively connected to at least two solenoids.

* * * * *